US012689293B2

(12) United States Patent
Hukel

(10) Patent No.: US 12,689,293 B2
(45) Date of Patent: Jul. 21, 2026

(54) SINGLE INDUCTOR MULTIPLE OUTPUT REGULATOR

(71) Applicant: Renesas Design (UK) Limited, Bourne End (GB)

(72) Inventor: Miroslav Hukel, Alling (DE)

(73) Assignee: Renesas Design (UK) Limited, Bourne End (GB)

( * ) Notice: Subject to any disclaimer, the term of this patent is extended or adjusted under 35 U.S.C. 154(b) by 235 days.

(21) Appl. No.: 18/364,175

(22) Filed: Aug. 2, 2023

(65) Prior Publication Data

US 2025/0047200 A1 Feb. 6, 2025

(51) Int. Cl.
| | |
|---|---|
| *H02M 3/158* | (2006.01) |
| *H02M 1/00* | (2007.01) |
| *H02M 3/07* | (2006.01) |

(52) U.S. Cl.
CPC ......... *H02M 3/158* (2013.01); *H02M 1/0095* (2021.05); *H02M 3/07* (2013.01)

(58) Field of Classification Search
CPC .... H02M 1/007; H02M 3/158; H02M 1/0095; H02M 3/07; H02M 1/009
See application file for complete search history.

(56) References Cited

U.S. PATENT DOCUMENTS

| | | | | |
|---|---|---|---|---|
| 9,203,312 | B2 * | 12/2015 | Chesneau | ............. H02M 3/156 |
| 10,910,947 | B2 | 2/2021 | Cavallini et al. | |
| 11,251,708 | B2 * | 2/2022 | Park | .................... H02M 3/1582 |
| 11,990,831 | B2 * | 5/2024 | Petersen | ............... G06F 1/3206 |

| | | | | |
|---|---|---|---|---|
| 2004/0135562 | A1 * | 7/2004 | Oden | .................... H02M 3/158 323/282 |
| 2008/0158915 | A1 * | 7/2008 | Williams | ................ H02M 3/07 363/21.06 |
| 2012/0032664 | A1 * | 2/2012 | Coleman | ............. H02M 3/1582 323/311 |
| 2012/0187932 | A1 * | 7/2012 | Singnurkar | ........... H02M 3/158 323/282 |
| 2012/0242309 | A1 * | 9/2012 | Korzeniowski | ....... H02M 3/158 323/282 |
| 2014/0225577 | A1 * | 8/2014 | Ivanov | ................ H02M 3/1582 323/225 |
| 2021/0050786 | A1 * | 2/2021 | Park | ........................ H02M 3/07 |
| 2023/0026364 | A1 * | 1/2023 | Kulkarni | ............... H02M 3/158 |
| 2023/0170805 | A1 * | 6/2023 | Wei | ........................ H02M 3/157 323/271 |

* cited by examiner

*Primary Examiner* — Gustavo A Rosario-Benitez
(74) *Attorney, Agent, or Firm* — SCULLY, SCOTT, MURPHY & PRESSER, P.C.

(57) ABSTRACT

A voltage regulator is described. The voltage regulator may comprise a first switch, an inductor, and a second switch coupled in series between the input port and a reference voltage port; at least one negative output rail coupled between a first intermediate node and a respective output port, where the first intermediate node is arranged between the first switch and the inductor; a capacitive element coupled between a second intermediate node and a third intermediate node, where the second intermediate node is arranged between the inductor and the second switch; a third switch coupled between the input port and the third intermediate node; at least one positive output rail coupled between the third intermediate node and a respective output port; a fourth switch coupled between the third intermediate node and the reference voltage port; and a fifth switch coupled between the first intermediate node and the reference voltage port.

22 Claims, 12 Drawing Sheets

100

200

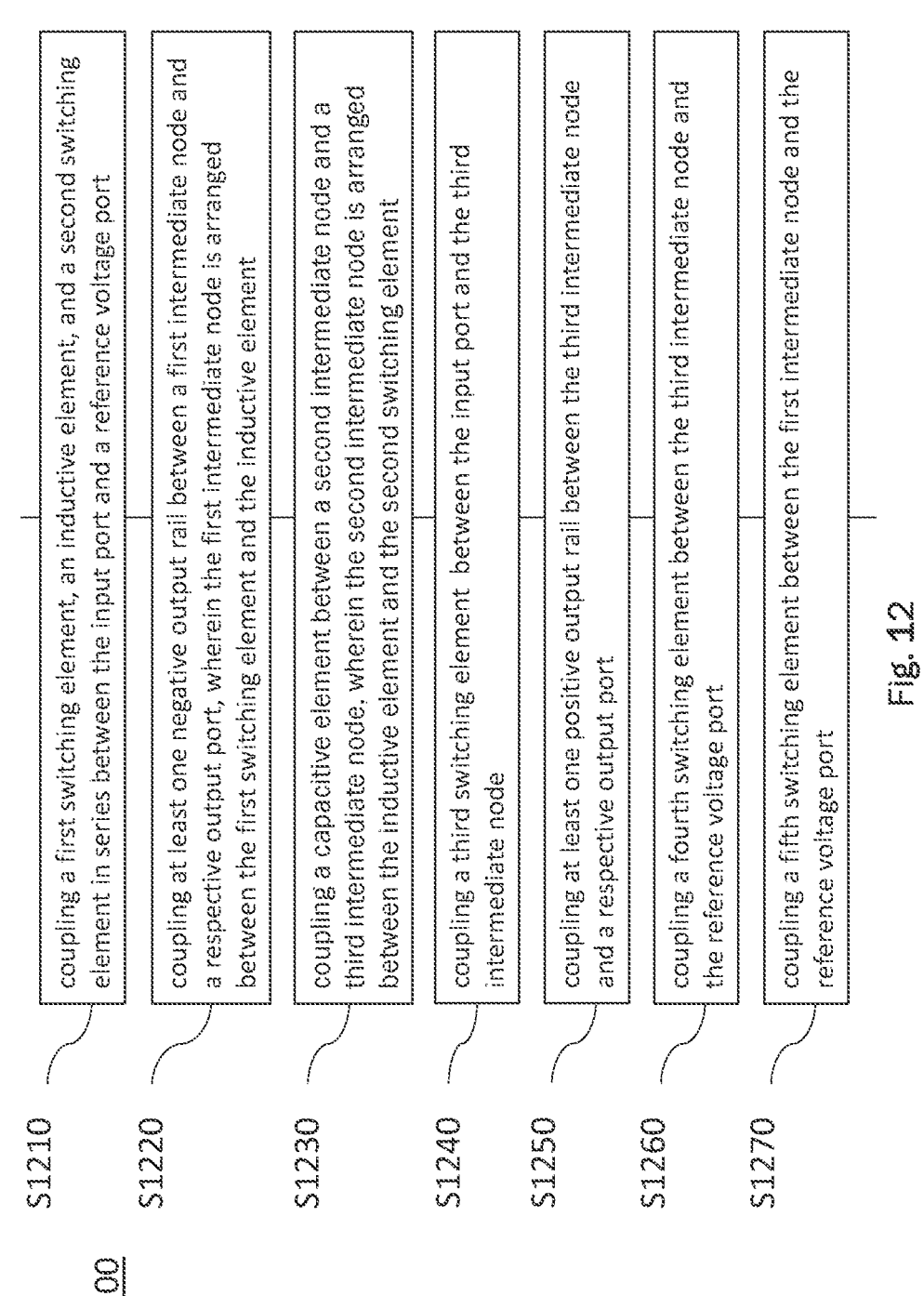

S1210 — coupling a first switching element, an inductive element, and a second switching element in series between the input port and a reference voltage port S1220 — coupling at least one negative output rail between a first intermediate node and a respective output port, wherein the first intermediate node is arranged between the first switching element and the inductive element S1230 — coupling a capacitive element between a second intermediate node and a third intermediate node, wherein the second intermediate node is arranged between the inductive element and the second switching element S1240 — coupling a third switching element between the input port and the third intermediate node S1250 — coupling at least one positive output rail between the third intermediate node and a respective output port S1260 — coupling a fourth switching element between the third intermediate node and the reference voltage port S1270 — coupling a fifth switching element between the first intermediate node and the reference voltage port

SINGLE INDUCTOR MULTIPLE OUTPUT REGULATOR

TECHNICAL FIELD

The present disclosure is directed to the general area of power converter topologies, and more specifically the power converter topology commonly referred to as the hybrid single inductor multiple output (SIMO) topology.

BACKGROUND

Due to the growing need to reduce, in number or size, unnecessary board components to allow manufacturers of smart mobile solutions to integrate additional features and reduce the cost of material, the market for mobile applications has seen in the recent past an increase in the demand for compact voltage regulators.

SIMO structures attract a lot of interest because a single inductor in a compact environment and under a variable switching control scheme offers the benefit of reduced Electromagnetic interference (EMI) and reduced board area. However, limitations on the minimum coil size exist mainly associated with the maximum current rating in the coil. Large coils increase the size and cost of a specific application.

In some possible implementations, a so-called hybrid SIMO topology has been proposed, which generally employs one flying capacitor for positive rails or one flying capacitor for negative rails. Generally speaking, the use of flying capacitor results in significantly reduced inductor peak currents.

Thus, broadly speaking, the focus of the present disclosure is to propose techniques and/or topologies for switching DC-DC voltage regulators that can achieve at least the same (or improved) functionality of conventional SIMO structures (hybrid or not); while at the same time also allowing other mode(s) of operation that the conventional (hybrid) SIMO topologies were not able to provide. There is a further need for methods of operating such switching DC-DC voltage regulators.

SUMMARY

In view of the above, the present disclosure generally provides proposes a DC-DC voltage regulator and a method of operating a DC-DC voltage regulator, having the features of the respective independent claims.

According to an aspect of the present disclosure, there is provided a DC-DC voltage regulator (e.g., a SIMO regulator) for converting an input voltage (e.g., $V_{IN}$) at an input port into one or more output voltages at respective output ports. In particular, the voltage regulator may comprise a first switching element, an inductive element (e.g., an inductor), and a second switching element that may be coupled (e.g., directly or indirectly connected) in series between the input port and a reference voltage port. The reference voltage port may for example be connected to ground (GND) or VSS (or any other suitable reference voltage). The voltage regulator may further comprise at least one negative output rail that may be coupled between a first intermediate node and a respective output port. More particularly, the first intermediate node may be arranged between the first switching element and the inductive element. Each of the negative output rails may be configured to generate a respective negative voltage (e.g., −5 V or the like) at a respective (negative) output port. The voltage regulator may further comprise a capacitive element (e.g., a capacitor) that may be coupled between a second intermediate node and a third intermediate node. More particularly, the second intermediate node may be arranged between the inductive element and the second switching element. The voltage regulator may further comprise a third switching element that may be coupled between the input port and the third intermediate node. The voltage regulator may yet further comprise at least one positive output rail that may be coupled between the third intermediate node and a respective output port. Similar to the negative output rail, each of the positive output rails may be configured to generate a respective positive voltage (e.g., +5 V or the like) at a respective (positive) output port. The voltage regulator may also further comprise a fourth switching element that may be coupled between the third intermediate node and the reference voltage port. Finally, the voltage regulator may comprise a fifth switching element that may be coupled between the first intermediate node and the reference voltage port. Notably, any of the switching devices mentioned in the present disclosure may be transistor devices, such as MOSFETs or the like. In some possible (but certainly non-limiting) implementations, the first and fourth switching elements may be simple transistors, while the second, third and fifth switching elements may be implemented as back-to-back transistors (or sometimes also referred to as bulk switches). As may be understood and appreciated by the skilled person, depending on the implementation of the switching devices, e.g., in the examples of MOSFET, the back-to-back configuration may refer to the configuration of two devices that are in series and either they have their drain terminals connected or their source terminals connected. The consequence (and most important property) of such back-to-back configuration is that their bulk diodes point in opposite directions. Certainly, any other suitable configuration or implementation may be adopted as well, depending on various requirements and/or circumstances.

Configured as proposed above, the DC-DC voltage regulator (or more specifically, the hybrid SIMO regulator) of the present disclosure maintains all the benefits that the conventional hybrid SIMO topology has over the conventional SIMO topology (such as lower inductor peak current, reduced conduction and core losses resulting in higher efficiency). Moreover, particularly in comparison with the conventional hybrid SIMO topology which requires a flying capacitor for the positive rail(s) or a flying capacitor for the negative rail(s), the presently proposed implementation generally requires only a single flying capacitor for both the positive and negative rails; and at the same time, extends the positive rail operation all the way down to the input voltage. Other potential advantages and/or benefits will become apparent in view of the description below.

In some examples, the fourth switching element may be configured for coupling the capacitive element in series with the inductive element for the at least one negative output rail during operation of the voltage regulator. Additionally or alternatively, the fifth switching element may be configured for coupling the capacitive element in series with the inductive element for the at least one positive output rail during operation of the voltage regulator.

In some examples, the third and fifth switching elements may be configured for charging the capacitive element via the inductive element during operation of the voltage regulator.

In some examples, the fourth and fifth switching elements may be configured for magnetizing the inductive element by using the capacitive element during operation of the voltage regulator.

In some examples, the first and fourth switching elements may be configured for magnetizing the inductive element by using both the input voltage and the capacitive element at the same time during operation of the voltage regulator. Configured as proposed, this may potentially enable two times faster inductor magnetizing time.

In some examples, the voltage regulator may comprise a first phase (of operation) for charging the capacitive element.

In some examples, during operation of the first phase, the third and fifth switching elements may be in an ON state (e.g., a conductive state), and the first, second and fourth switching elements are in an OFF state (e.g., a non-conductive state), such that the capacitive element may be charged via the inductive element.

In some examples, the voltage regulator may comprise a second phase for magnetizing the inductive element.

In some examples, during a first operation of the second phase, the first, second and third switching elements may be in an ON state, and the fourth and fifth switching elements may be in an OFF state, such that the capacitive element may be charged and the inductive element is magnetized from the input voltage.

In some examples, during a second operation of the second phase, the fourth and fifth switching elements may be in an ON state, and the first, second and third switching elements may be in an OFF state, such that the inductive element is magnetized from the capacitive element.

In some examples, during a third operation of the second phase, the first and fourth switching elements may be in an ON state, and the second, third and fifth switching elements may be in an OFF state, such that the inductive element is magnetized from both the input voltage and the capacitive element. As indicated earlier, this may result in potentially two times faster in magnetizing the inductor.

In some examples, during operation of a third phase of the voltage regulator, the fourth switching element may be in an ON state, and the first, second, third and fifth switching elements may be in an OFF state, thereby coupling the inductive element to a (e.g., preconfigured or predetermined) negative output rail and in series with the capacitive element to the reference voltage port (e.g., GND or the like).

In some examples, during operation of a fourth phase of the voltage regulator, the fifth switching element may be in an ON state, and the first, second, third and fourth switching elements may be in an OFF state, thereby coupling the inductive element to the reference voltage port and in series with the capacitive element to a positive output rail.

According to another aspect of the present disclosure, there is provided a method for operating a DC-DC voltage regulator (e.g., a SIMO regulator) for converting an input voltage (e.g., $V_{IN}$) at an input port into one or more output voltages respectively at respective output ports. In particular, the method may comprise coupling (e.g., directly or indirectly connecting) a first switching element, an inductive element (e.g., an inductor), and a second switching element in series between the input port and a reference voltage port. The reference voltage port may for example be connected to ground (GND) or VSS (or any other suitable reference voltage). The method may further comprise coupling at least one negative output rail between a first intermediate node and a respective output port. More particularly, the first intermediate node may be arranged between the first switching element and the inductive element. Each of the negative output rails may be configured to generate a respective negative voltage (e.g., −5 V or the like) at a respective (negative) output port. The method may further comprise coupling a capacitive element (e.g., a capacitor) between a second intermediate node and a third intermediate node. More particularly, the second intermediate node may be arranged between the inductive element and the second switching element. The method may further comprise coupling a third switching element between the input port and the third intermediate node. The method may yet further comprise coupling at least one positive output rail between the third intermediate node and a respective output port. Similar to the negative output rail, each of the positive output rails may be configured to generate a respective positive voltage (e.g., +5 V or the like) at a respective (positive) output port. The method may also comprise coupling a fourth switching element between the third intermediate node and the reference voltage port. Finally, the method may comprise coupling a fifth switching element between the first intermediate node and the reference voltage port. Notably, any of the switching devices mentioned in the present disclosure may be transistor devices, such as MOS-FETs or the like.

Configured as proposed above, the DC-DC voltage regulator (or more specifically, the hybrid SIMO regulator) of the present disclosure maintains all the benefits that the conventional hybrid SIMO topology has over the conventional SIMO topology. Moreover, particularly in comparison with the conventional hybrid SIMO topology which requires a flying capacitor for the positive rail(s) or a flying capacitor for the negative rail(s), the presently proposed implementation generally requires only a single flying capacitor for both the positive and negative rails; and at the same time, extends the positive rail operation all the way down to the input voltage. Other potential advantages and/or benefits will become apparent in view of the description below.

In some examples, the method may further comprise, during operation of a first phase of the voltage regulator for charging the capacitive element: switching the third and fifth switching elements to an ON state (e.g., a conductive state), and switching the first, second and fourth switching elements to an OFF state (e.g., a non-conductive state), for charging the capacitive element via the inductive element.

In some examples, the method may further comprise, during a first operation of a second phase of the voltage regulator for magnetizing the inductive element: switching the first, second and third switching elements to an ON state, and switching the fourth and fifth switching elements to an OFF state, for charging the capacitive element and magnetizing the inductive element from the input voltage.

In some examples, the method may further comprise, during a second operation of a second phase of the voltage regulator for magnetizing the inductive element: switching the fourth and fifth switching elements to an ON state, and switching the first, second and third switching elements to an OFF state, for magnetizing the inductive element from the capacitive element.

In some examples, the method may further comprise, during a third operation of a second phase of the voltage regulator for magnetizing the inductive element: switching the first and fourth switching elements to an ON state, and switching the second, third and fifth switching elements to an OFF state, for magnetizing the inductive element from both the input voltage and the capacitive element.

In some examples, the method may further comprise, during operation of a third phase of the voltage regulator:

switching the fourth switching element to an ON state, and switching the first, second, third and fifth switching elements to an OFF state, for coupling the inductive element to a negative output rail and in series with the capacitive element to the reference voltage port.

In some examples, the method may further comprise, during operation of a fourth phase of the voltage regulator: switching the fifth switching element to an ON state, and switching the first, second, third and fourth switching elements to an OFF state, for coupling the inductive element to the reference voltage port and in series with the capacitive element to a positive output rail.

In some examples, the method may further comprise, for generating a positive output voltage larger than two times the input voltage: repeatedly operating the voltage regulator according to a predetermined operation sequence that involves: switching the third and fifth switching elements to an ON state, and switching the first, second and fourth switching elements to an OFF state; switching the first and fourth switching elements to the ON state, and switching the second, third and fifth switching elements to the OFF state; and switching the first switching element to the ON state, and switching the second, third, fourth and fifth switching elements to the OFF state.

In some examples, the method may further comprise, for generating a positive output voltage larger than the input voltage but less than two times the input voltage: repeatedly operating the voltage regulator according to a predetermined operation sequence that involves: switching the third and fifth switching elements to an ON state, and switching the first, second and fourth switching elements to an OFF state; switching the first switching element to the ON state, and switching the second, third, fourth and fifth switching elements to the OFF state; and switching the fifth switching element to the ON state, and switching the first, second, third and fourth switching elements to the OFF state.

In some examples, the method may further comprise, for generating a negative output voltage having an absolute magnitude larger than the input voltage: repeatedly operating the voltage regulator according to a predetermined operation sequence that involves: switching the third and fifth switching elements to an ON state, and switching the first, second and fourth switching elements to an OFF state; switching the fourth and fifth switching elements to the ON state, and switching the first, second and third switching elements to the OFF state; and switching the fourth switching element to the ON state, and switching the first, second, third and fifth switching elements to the OFF state.

In some examples, the method may further comprise, for generating a negative output voltage having an absolute magnitude larger than 0 but less than the input voltage: repeatedly operating the voltage regulator according to a predetermined operation sequence that involves: switching the third and fifth switching elements to an ON state, and switching the first, second and fourth switching elements to an OFF state; switching the second switching element to the ON state, and switching the first, third, fourth and fifth switching elements to the OFF state; and switching the second and third switching elements to the ON state, and switching the first, fourth and fifth switching elements to the OFF state.

The details of the disclosed method can be implemented as an apparatus (e.g., a SIMO regulator) adapted to execute some or all of the steps of the method, and vice versa, as the skilled person will appreciate. In particular, it is understood that methods according to the disclosure relate to methods of operating the circuits according to the above embodiments and variations thereof, and that respective statements made with regard to the circuits likewise apply to the corresponding methods.

It is also understood that in the present document, the term "couple" or "coupled" refers to elements being in electrical communication with each other, whether directly connected e.g., via wires, or in some other manner (e.g., indirectly). Notably, one example of being coupled is being connected.

BRIEF DESCRIPTION OF THE DRAWINGS

Example embodiments of the disclosure are explained below with reference to the accompanying drawings, wherein like reference numbers indicate like or similar elements, and wherein FIG. 1 schematically illustrates an example of a hybrid SIMO regulator topology with one negative output rail and one positive output rail, FIG. 2 schematically illustrates an example of a DC-DC voltage regulator topology according to embodiments of the disclosure, FIG. 3 schematically illustrates an example of a first operation of a first phase of the DC-DC voltage regulator of FIG. 2 according to embodiments of the disclosure, FIG. 4 schematically illustrates an example of a second operation of the first phase of the DC-DC voltage regulator of FIG. 2 according to embodiments of the disclosure, FIG. 5 schematically illustrates an example of a first operation of a second phase of the DC-DC voltage regulator of FIG. 2 according to embodiments of the disclosure, FIG. 6 schematically illustrates an example of a second operation of the second phase of the DC-DC voltage regulator of FIG. 2 according to embodiments of the disclosure, FIG. 7 schematically illustrates an example of a third operation of the second phase of the DC-DC voltage regulator of FIG. 2 according to embodiments of the disclosure, FIG. 8 schematically illustrates an example of a first operation of a third phase of the DC-DC voltage regulator of FIG. 2 according to embodiments of the disclosure, FIG. 9 schematically illustrates an example of a second operation of the third phase of the DC-DC voltage regulator of FIG. 2 according to embodiments of the disclosure, FIG. 10 schematically illustrates an example of a first operation of a fourth phase of the DC-DC voltage regulator of FIG. 2 according to embodiments of the disclosure, FIG. 11 schematically illustrates an example of a second operation of the fourth phase of the DC-DC voltage regulator of FIG. 2 according to embodiments of the disclosure, and FIG. 12 is a flowchart schematically illustrating an example of a method of operating a DC-DC voltage regulator according to embodiments of the disclosure.

DETAILED DESCRIPTION

As indicated above, identical or like reference numbers in the present disclosure may, unless indicated otherwise, indicate identical or like elements, such that repeated description thereof may be omitted for reasons of conciseness. Also, any switching elements/devices mentioned in this disclosure may be transistor devices, such as MOSFETs, or any other suitable switching devices. In some of the figures the switching devices may be simplified, but they should be understood as the same or similar switching devices as shown in other figures.

As indicated earlier, in some possible implementations of the conventional hybrid SIMO topology where a flying capacitor is disposed for the negative rail(s) or a flying capacitor is disposed for the positive rail(s).

Figure 1:
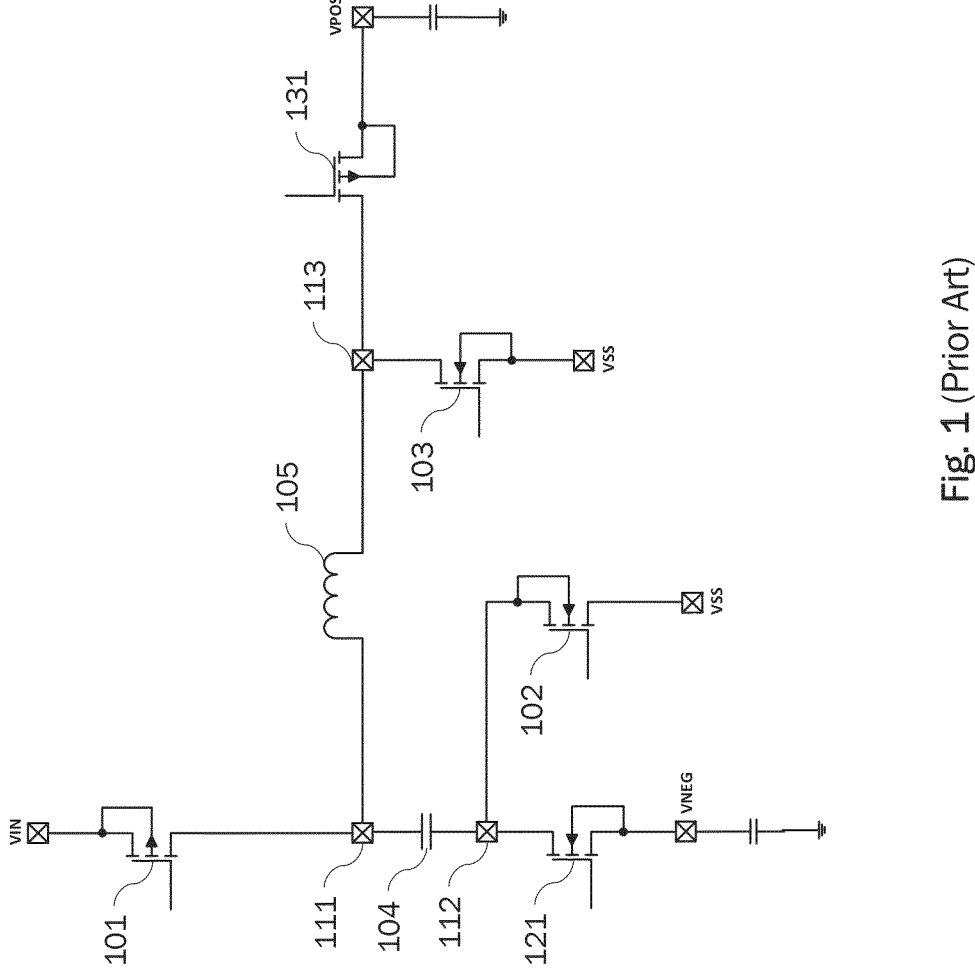

For ease of understanding, an example of such conventional hybrid SIMO regulator implementation 100 is schematically shown in FIG. 1.

In particular, in the exemplary SIMO regulator 100 of FIG. 1, the regulator 100 comprises a high side switching device (e.g., a transistor device, a MOSFET, or the like) 101, an inductive element (e.g., an inductor) 105 and a boost low side switching device (e.g., a transistor device) 103 coupled in series between an input voltage level ($V_{IN}$) and a predetermined voltage level. The predetermined voltage level may for example be VSS or ground (GND) or any other suitable reference voltage level. The regulator 100 further comprises a negative output rail and a positive output rail. The negative output rail comprises a low side switching device (e.g., a transistor device) 121 and is coupled between a first intermediate node 111 and a (negative) output node, where a negative output voltage level ($V_{NEG}$) is generated. The first intermediate node 111 is arranged between the high side switching device 101 and the inductive element 105. Similarly, the positive output rail comprises a boost high side switching device (e.g., a transistor device) 131 and is coupled between a second intermediate node 113 and a (positive) output node, where a positive output voltage level ($V_{POS}$) is generated. The second intermediate node 113 is arranged between the inductive element 105 and the boost low side switching device 131. In addition, a capacitive element (e.g., a flying capacitor) 104 and a charging switching device 102 are provided, in order to reduce the voltage drop on the coil of the inductive element 105 and the low side switching device 121. In such an arrangement, it may be considered that the flying capacitor 104 is configured for the negative rail. Particularly, the capacitive element 104 and the charging switching element 102 are coupled in series between a first intermediate node 111 and the predetermined voltage level (e.g., VSS or GND). A second intermediate node 112 is arranged between the capacitive element 104 and the charging switching element 102. As will be appreciated by the skilled person, the voltage regulator may also comprise respective capacitors (not particularly labelled) coupled between the respective output ports and ground. Incidentally, it may be worthwhile to note that, in order for operating the switching devices, the regulator may further comprise a control unit (not shown in the figures) for generating the corresponding control signals.

The operation of such conventional hybrid SIMO regulator 100 of FIG. 1, which is generally considered to be readily known or understandable to a person skilled in the art, is thus not illustrated here in detail for the sake of conciseness.

Figure 2:
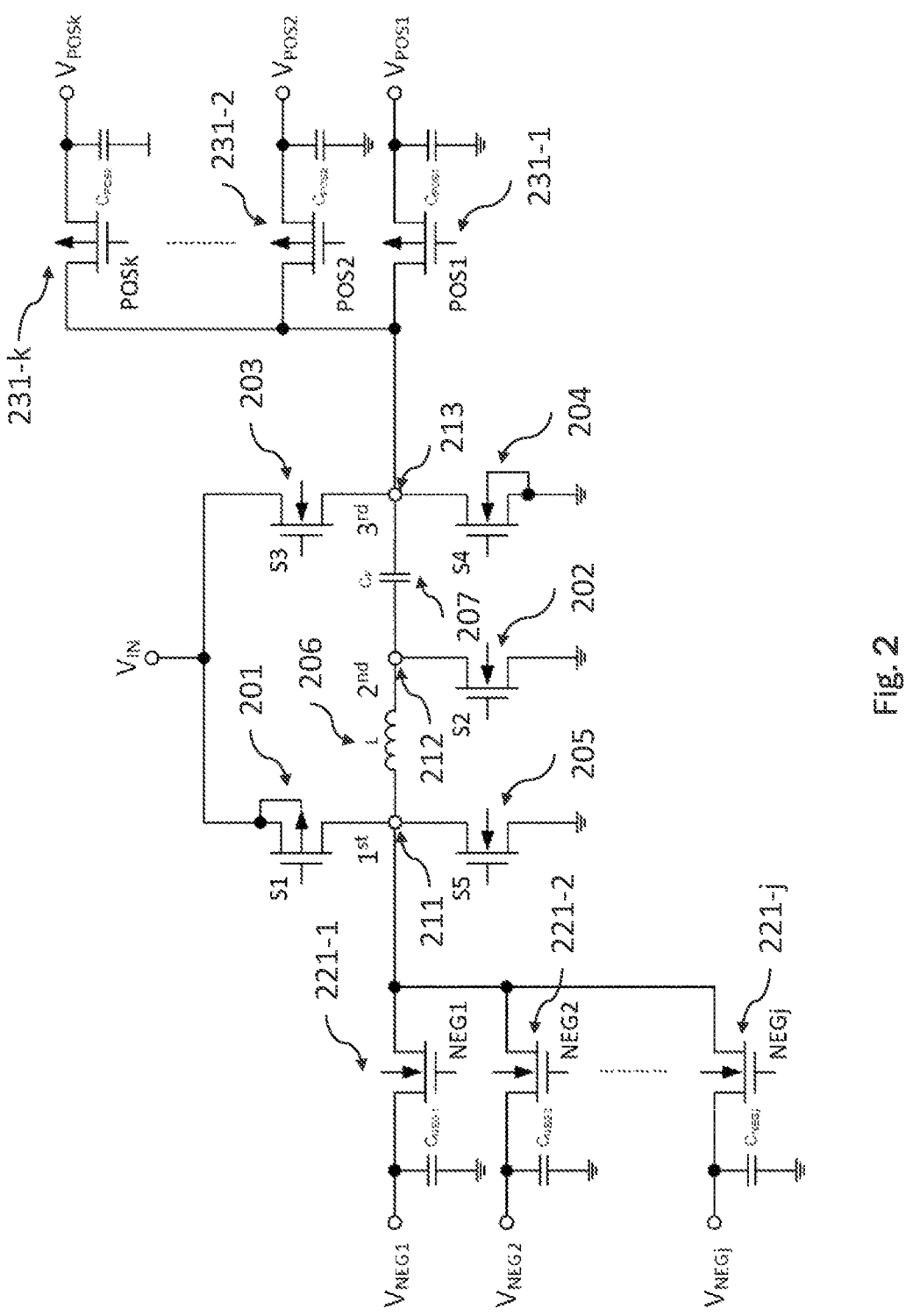

Reference is now made to FIG. 2, which schematically illustrates an example of a DC-DC voltage regulator topology (or more specifically, a hybrid SIMO regulator topology) 200 according to embodiments of the disclosure.

In a broad sense, the DC-DC voltage regulator topology as proposed in the present disclosure share a similar arrangement/architecture of switching elements that could be configured to serve for charging the flying capacitor as well as all switching elements connected to the inductor. Thus, repeated description thereof may be omitted for reasons of conciseness. On top, the present disclosure generally proposes to add two more switching elements (more specifically, switching elements 204 and 205 as shown in FIG. 2) that could be configured to enable using only one external flying capacitor to provide operations in hybrid mode for both positive and negative rails. Generally speaking, this means lowering inductor peak current, and hence, lowering conduction and core losses resulting in higher efficiency. Particularly, as noted above already, unlike the conventional hybrid-SIMO topology as described above with reference to FIG. 1, the hybrid SIMO implementation as proposed in the present disclosure supports both negative and positive rails requiring a single flying capacitor; and at the same time, extends the positive rail operation all the way down to the input voltage ($V_{IN}$).

To be more specific, as shown in the example implementation 200 of FIG. 2, a first switching element 201, an inductive element (e.g., an inductor) 206, and a second switching element 202 may be arranged to be coupled (e.g., directly or indirectly connected) in series between the input port ($V_{IN}$) and a reference voltage port (e.g., GND).

The voltage regulator 200 further comprises at least one negative output rail that may be coupled between a first intermediate node 211 and a respective output port. More particularly, the first intermediate node 211 may be seen as being arranged between the first switching element 201 and the inductive element 206. Each of the negative output rails may comprise a respective switching element 221-1, 221-2, . . . , 221-$j$ and may be configured to generate a respective negative voltage $V_{NEG1}, V_{NEG2}, \ldots, V_{NEGj}$ (e.g., −5 V or the like) at a respective (negative) output port.

Similarly, the voltage regulator 200 also comprises at least one positive output rail that may be coupled between a third intermediate node 213 and a respective output port. Similar to the negative output rail(s) described above, each of the positive output rails may comprise a respective switching element 231-1, 231-2, . . . , 231-$k$ and may be configured to generate a respective positive voltage $V_{POS1}, V_{POS2}, \ldots, V_{POSk}$ (e.g., +5 V or the like) at a respective (positive) output port.

The voltage regulator 200 further comprises a capacitive element (e.g., a capacitor) 207 that may be arranged to be coupled between a second intermediate node 212 and the third intermediate node 213. More particularly, the second intermediate node may be seen as being arranged between the inductive element 206 and the second switching element 202.

The voltage regulator 200 further comprises a third switching element 203 that is coupled between the input port and the third intermediate node 213.

Finally, the voltage regulator 200 comprises a fourth switching element 204 that is coupled between the third intermediate node 213 and the reference voltage port; and also a fifth switching element 205 that is coupled between the first intermediate node 211 and the reference voltage port.

As mentioned above, in some possible (but certainly non-limiting) cases, the first and fourth switching elements 201 and 204 may be implemented as simple transistors, while the second, third and fifth switching elements 202, 203 and 205 may be implemented as back-to-back transistors (or sometimes also referred to as bulk switches). As may be understood and appreciated by the skilled person, depending on the implementation of the switching devices, e.g., in the examples of MOSFET, the back-to-back configuration may refer to the configuration of two devices that are in series and either they have their drain terminals connected or their source terminals connected. The consequence (and most important property) of such back-to-back configuration is that their bulk diodes point in opposite directions. Certainly, any other suitable configuration or implementation may be adopted as well, depending on various requirements and/or circumstances.

Configured as proposed, the DC-DC voltage regulator 200 maintains all the benefits that the conventional hybrid SIMO topology has over the conventional SIMO topology (such as lower inductor peak current, reduced conduction and core losses resulting in higher efficiency). Moreover, particularly in comparison with the conventional hybrid SIMO topology (e.g., the one described with reference to FIG. 1) which requires a flying capacitor for the positive rail(s) or a flying capacitor for the negative rail(s), the presently proposed implementation 200 requires only a single flying capacitor for both the positive and negative rails; and at the same time, extends the positive rail operation all the way down to the input voltage.

Particularly, as will be described in detail below with reference to the figures, the provision of the (newly introduced) fourth switching element 204 may be understood to enable coupling (connecting) the flying capacitor 207 in series with the inductor 206 for the negative rails during certain operation of the voltage regulator 200. Further, the provision of the fourth switching element 204 may also be configured to enable $V_{IN}+V_{NEGn}$ (where $n\in[1, j]$) voltage across the inductor 206 by connecting the inductor 206 to $V_{NEGn}$ and in series with flying capacitor 207 to GND.

On the other hand, the provision of the (newly introduced) fifth switching element 205 may be understood to enable coupling (connecting) the flying capacitor 207 in series with the inductor 206 for the positive rails during certain operation of the voltage regulator 200. Further, the provision of the fifth switching element 205 may also be configured to enable $V_{IN}-V_{POSn}$ (where $n\in[1, k]$) voltage across the inductor 206 by connecting the inductor 206 between GND and in series with the flying capacitor to $V_{POSn}$.

In addition, the provision of both the fourth and fifth switching elements 204 and 205 generally enable magnetizing the inductor 206 from the flying capacitor 207 during certain operation of the voltage regulator 200.

Moreover, the provision of the (newly introduced) fourth switching element 204 and/or the (newly introduced) fifth switching element 205, when operated in combination with one or more of the other existing switching element(s) (e.g., switching elements 201, 202, or 203), may also enable operations that were not possible in the conventional (hybrid) SIMO regulator topologies.

For instance, the provision of the first switching element 201 and the fourth switching element may be configured to enable magnetizing the inductor 206 from both the source ($V_{IN}$) and the flying capacitor 208 at the same time, which may in turn enable two times faster inductor magnetizing time.

On the other hand, the provision of the third switching element 203 and the fifth switching element 205 may be configured to enable charging the flying capacitor 207 via the inductor 206, thereby significantly reducing inductor voltage ringing while at the same time reusing the inductor's remaining energy to recharge flying capacitor.

Of course, as can also be understood and appreciated by the skilled person, the above are merely provided to serve illustrative purposes and should in no way be understood to constitute a limitation of any kind. Any other suitable arrangement and/or operation of (the switching elements of) the voltage regulator may be implemented, depending on various requirements and/or circumstances. Some of those possible further arrangements and/or operations and the corresponding benefit/advantage associated thereof may become more apparent in view of the description below with reference to FIGS. 3 to 11.

Notably, for the sake of better illustration and understanding, the description for FIGS. 3 to 11 will be organized as follows. First, the figures illustrating the operational phases (or modes) of the voltage regulator 200 of FIG. 2 that are not supported by the conventional hybrid SIMO regulator 100 of FIG. 1 will be described, which essentially comprise FIGS. 4, 6, 7, 9 and 10. Then, the remaining operational phases/modes of the voltage regulator 200 of FIG. 2 that are supported (or partially supported) by the conventional hybrid SIMO regulator 100 of FIG. 1 will be described.

Figure 4:
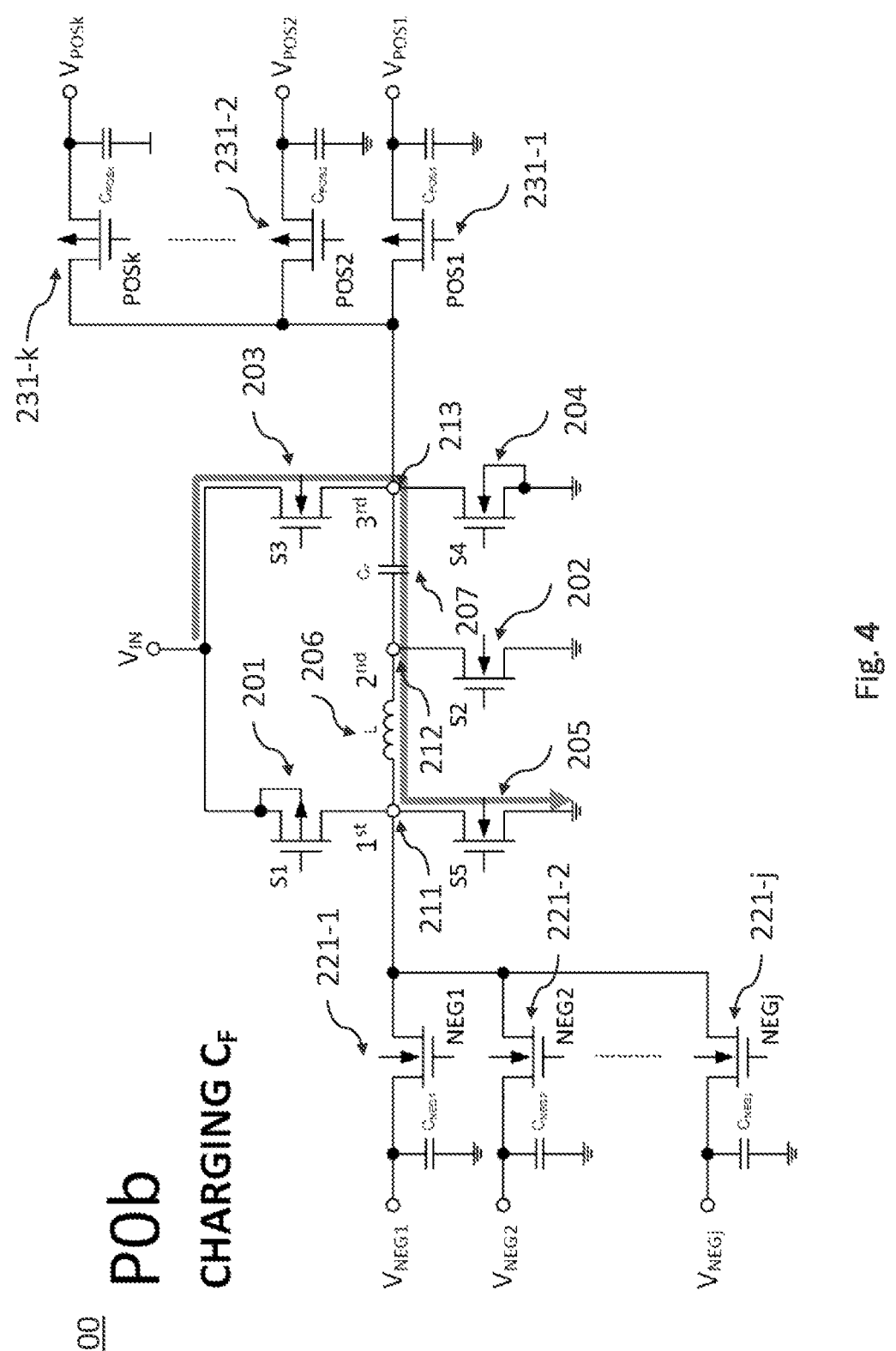

To begin with, FIG. 4 schematically shows how the third switching element 203 and the fifth switching element 205 may be jointly configured to enable the charging of the flying capacitor 207 via the inductor 206 (as indicated by the arrow). Particularly, in this operational phase of the voltage regulator 200 (indicated as P0*b* in FIG. 4), the third and fifth switching elements 203 and 205 are set to an ON (conducting) state, while the first, second and fourth switching elements 201, 202 and 204 are set to an OFF (non-conducting) state, thereby charging the capacitor 207 via the inductor 206. Incidentally, it may be understood that all switching elements in the negative and positive rails are in the OFF state in this operational phase (for charging the capacitor). Configured as proposed, particularly by reusing the remaining energy in the inductor 206 to recharge the flying capacitor 207, the inductor voltage ringing may be significantly reduced.

Figure 6:
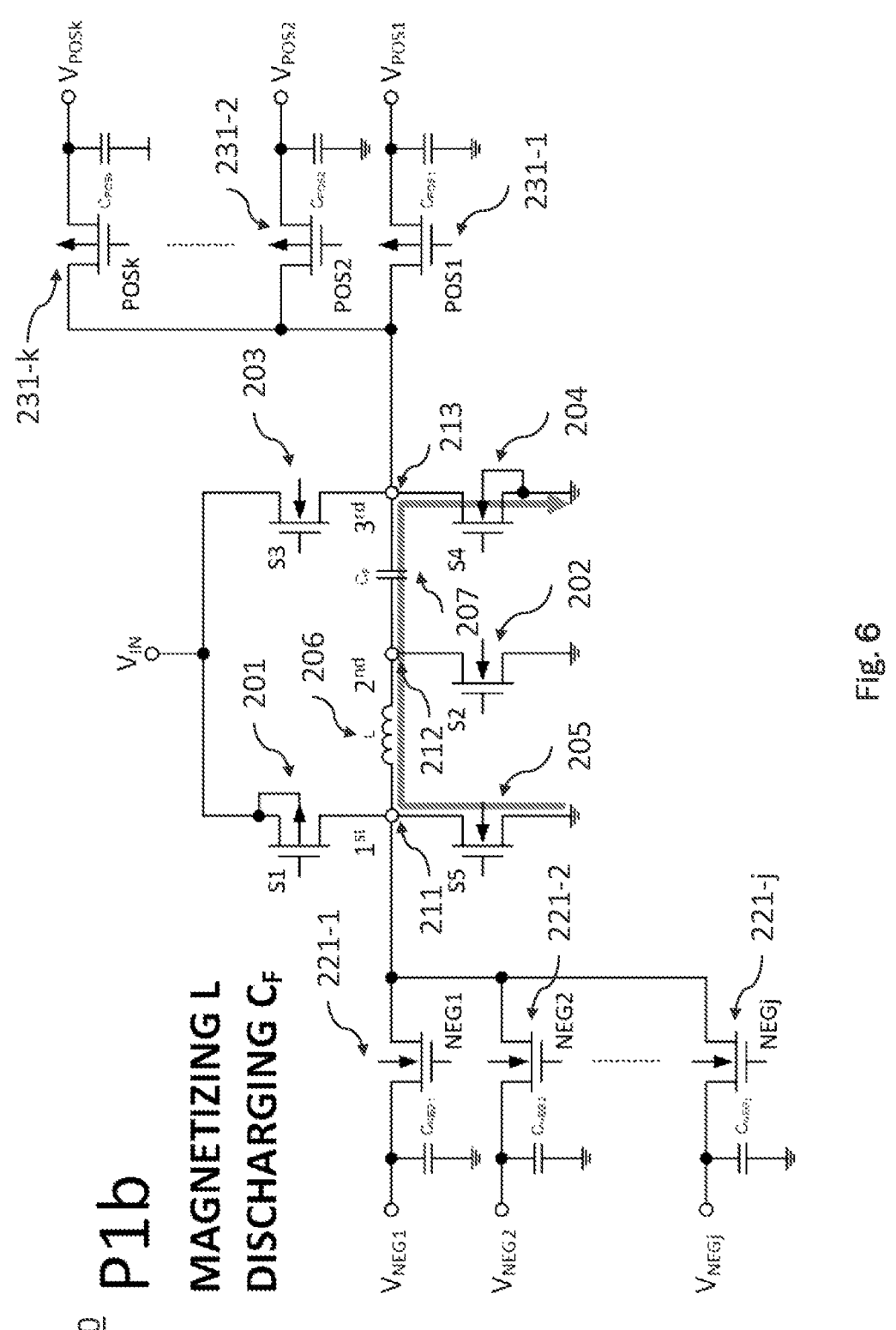
Figure 7:
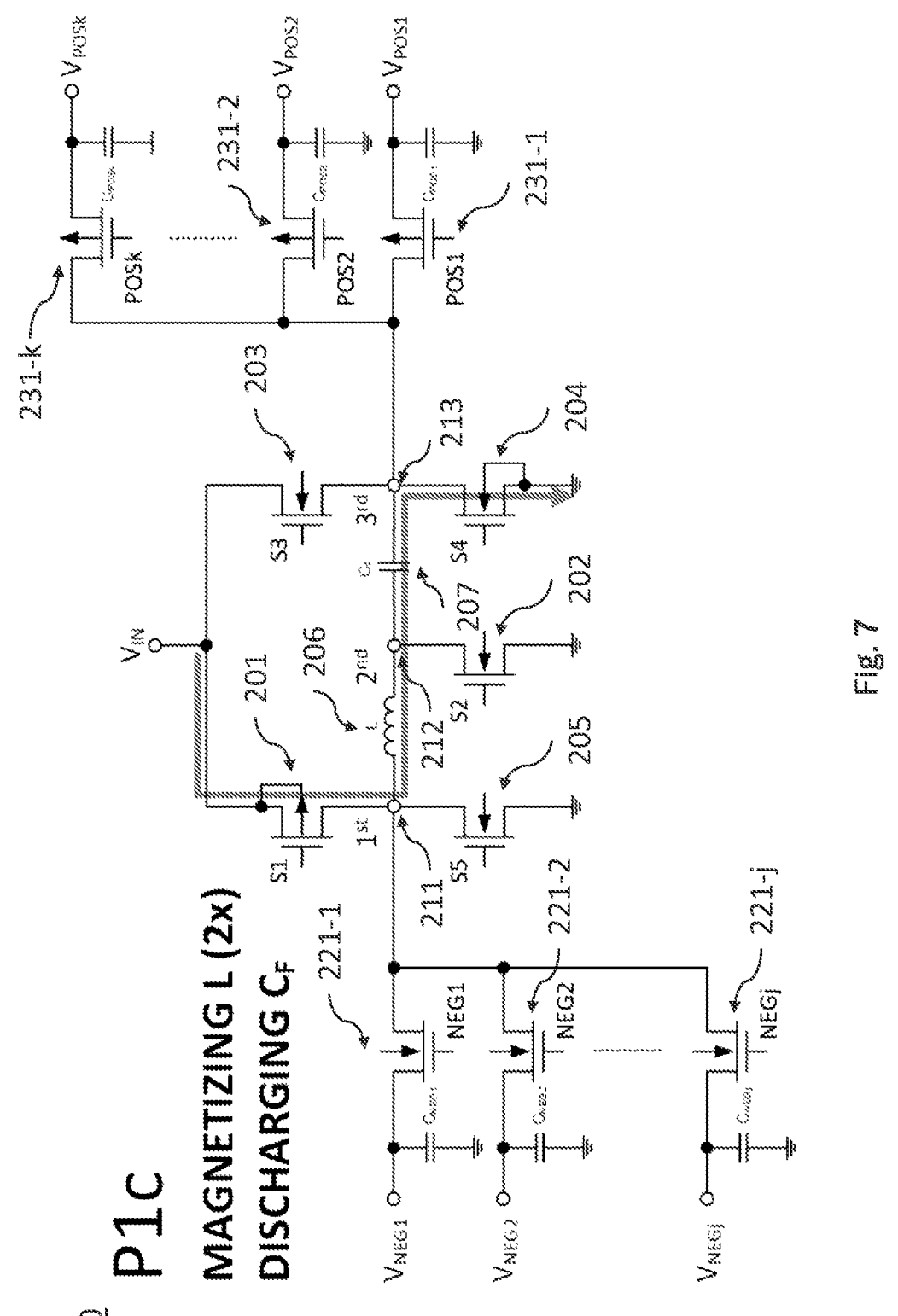

Next, FIG. 6 schematically shows how the fourth and fifth switching elements 204 and 205 may be jointly configured to enable another mode of magnetizing the inductor 206 by using the flying capacitor 207 as a potential source. Particularly, as indicated by the arrow, during this operational phase (indicated as P1*b* in FIG. 6), the fourth and fifth switching elements 204 and 205 are in the ON state, while the first, second and third switching elements 201, 202 and 203 are in the OFF state, thereby enabling magnetizing the inductor 206 from the capacitor 207. Notably, compared with the operational phase for magnetizing the inductor in the conventional SIMO topology, in the proposal of the present disclosure, no (high) current from the input/source would be necessary, as the inductor is generally magnetized from the energy of the capacitor, thereby resulting in reduced EMI (electromagnetic interference). It may be worthwhile to further note that, broadly speaking, this illustrated operation generally enables utilization of lower ohmic path (e.g., when the fourth and fifth switching elements 204 and 205 may be implemented by using N-type MOSFETs or the like) and less switching events when utilizing hybrid mode of operation for $|V_{NEGn}|>V_{IN}$ for negative rails and boost mode of operation for $V_{POSn}<2\times V_{IN}$ for positive rails. FIG. 7 schematically shows how the fourth switching element 204 together with the first switching element may be configured to enable two times $V_{IN}$ voltage across the inductor 206 by connecting the inductor 206 between $V_{IN}$ and GND and in series with the flying capacitor 207. More specifically, in such operational phase (indicated as P1C in FIG. 7), the first and fourth switching elements 201 and 204 are in the ON state, while the second, third and fifth switching elements 202, 203 and 205 are in the OFF state, such that the inductor 206 is magnetized from both the input voltage and the capacitor 207. Generally speaking, twice or double the input voltage may be understood to lead to (around) two times faster reacting for the same peak current, which in turn, may result in lower conductive loss.

Figure 9:
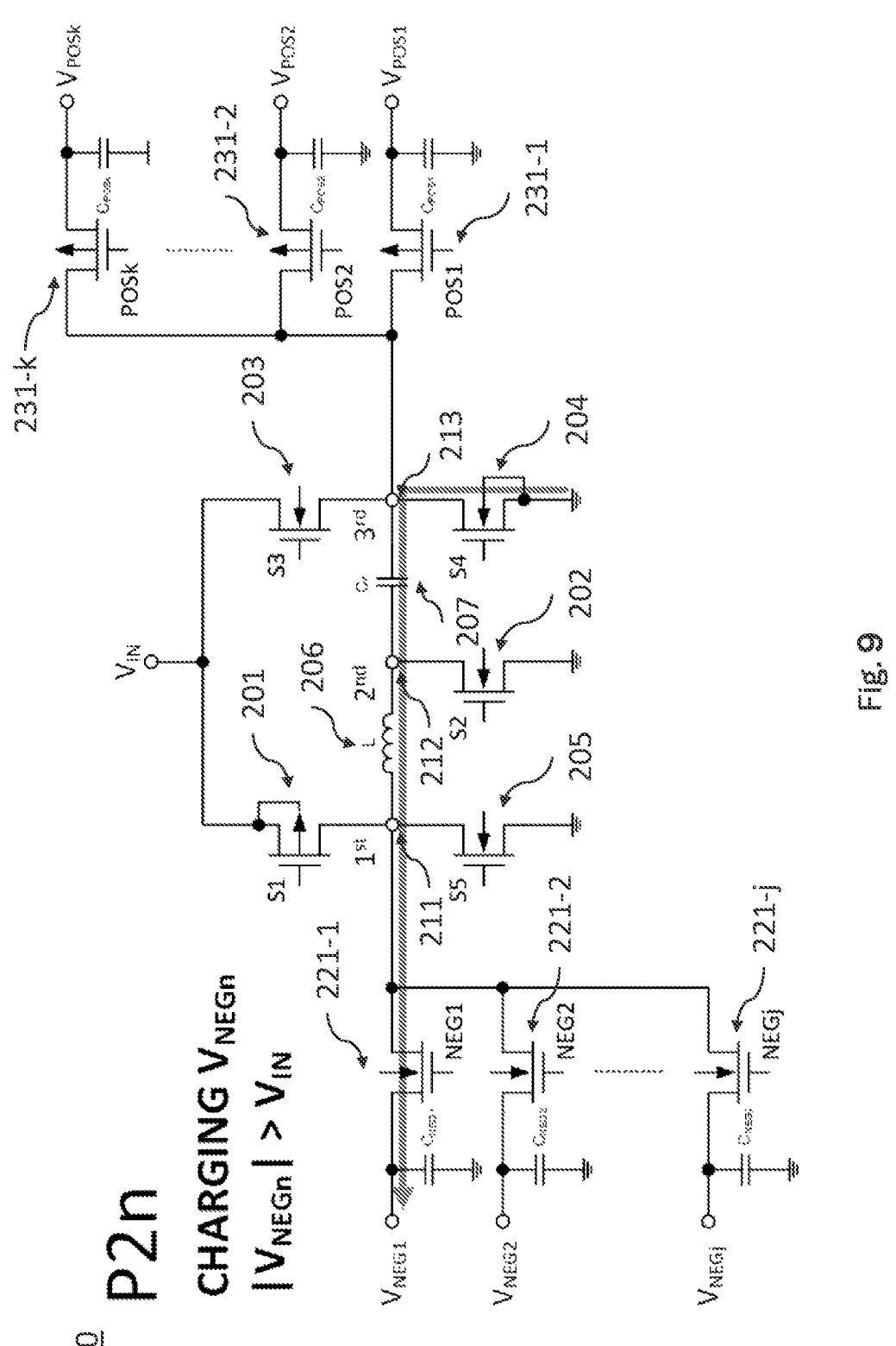

Further, FIG. 9 schematically shows how the fourth switching element 204 may be configured to enable $V_{IN}+V_{NEGn}$ voltage across the inductor 206 by connecting the inductor 206 to any one of the negative rails ($V_{NEG1}$ through the switching element 221-1 in the example of FIG. 9) and in series with the flying capacitor 207 to GND, thereby enabling hybrid mode of operation for $|V_{NEGn}|>V_{IN}$ for negative rails. More specifically, in such operational phase (indicated as P2n in FIG. 9), the fourth switching element 204 is in the ON state, and the first, second, third and fifth switching elements 201, 202, 203 and 205 are in the OFF state, thereby coupling the inductor to a negative output rail and in series with the capacitor 207 to the reference voltage port (GND).

Figure 10:
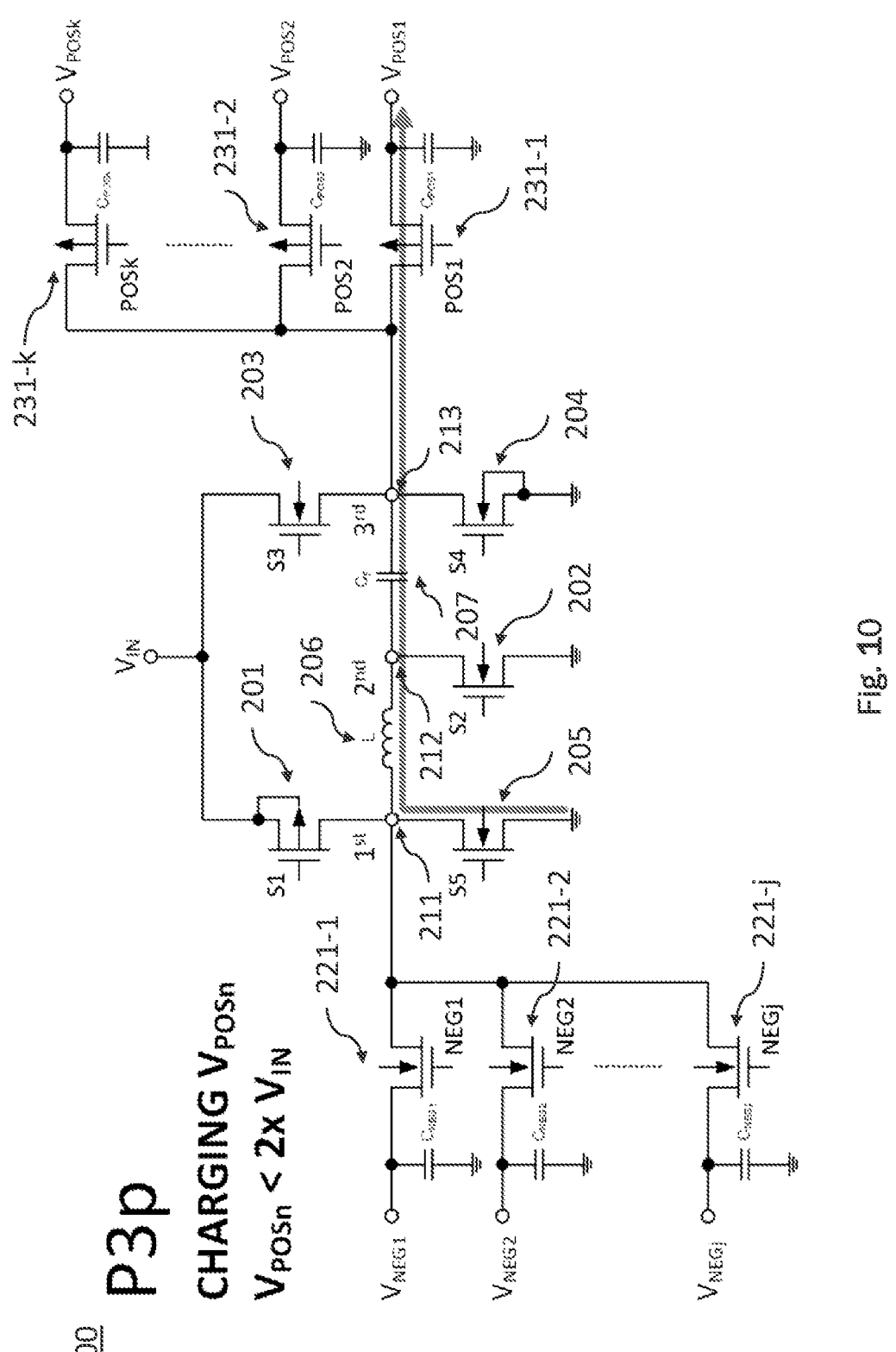

In addition, FIG. 10 schematically shows how the fifth switching element 205 may be configured to enable $V_{IN}$–$V_{POSn}$ voltage across the inductor 206 by connecting the inductor 206 between GND and in series with the flying capacitor 207 to any one of the positive rails ($V_{POS1}$ through the switching element 231-1 in the example of FIG. 10). More specifically, in such operational phase (indicated as P3p in FIG. 10), the fifth switching element 205 is in the ON state, while the first, second, third and fourth switching elements 201, 202 and 204 are in the OFF state, thereby coupling the inductor 206 to the reference voltage port (GND) and in series with the capacitor 207 to a positive output rail. Incidentally, it may be worth mentioning that, in such phase, the flying capacitor 207 is utilized to de-magnetize the inductor 206.

As noted earlier, the above-illustrated operational phases/modes are generally neither supported in the conventional SIMO topology nor the conventional hybrid SIMO topology (e.g., as schematically shown in FIG. 1); or put differently, cannot find corresponding ones in the operational phases/modes of the conventional (hybrid) SIMO topology.

Next, with reference to the remaining figures, other possible phases/modes for operating the voltage regulator 200 of FIG. 2 will also be briefly described, and if applicable, also potential further benefit(s) associated therewith.

Figure 3:
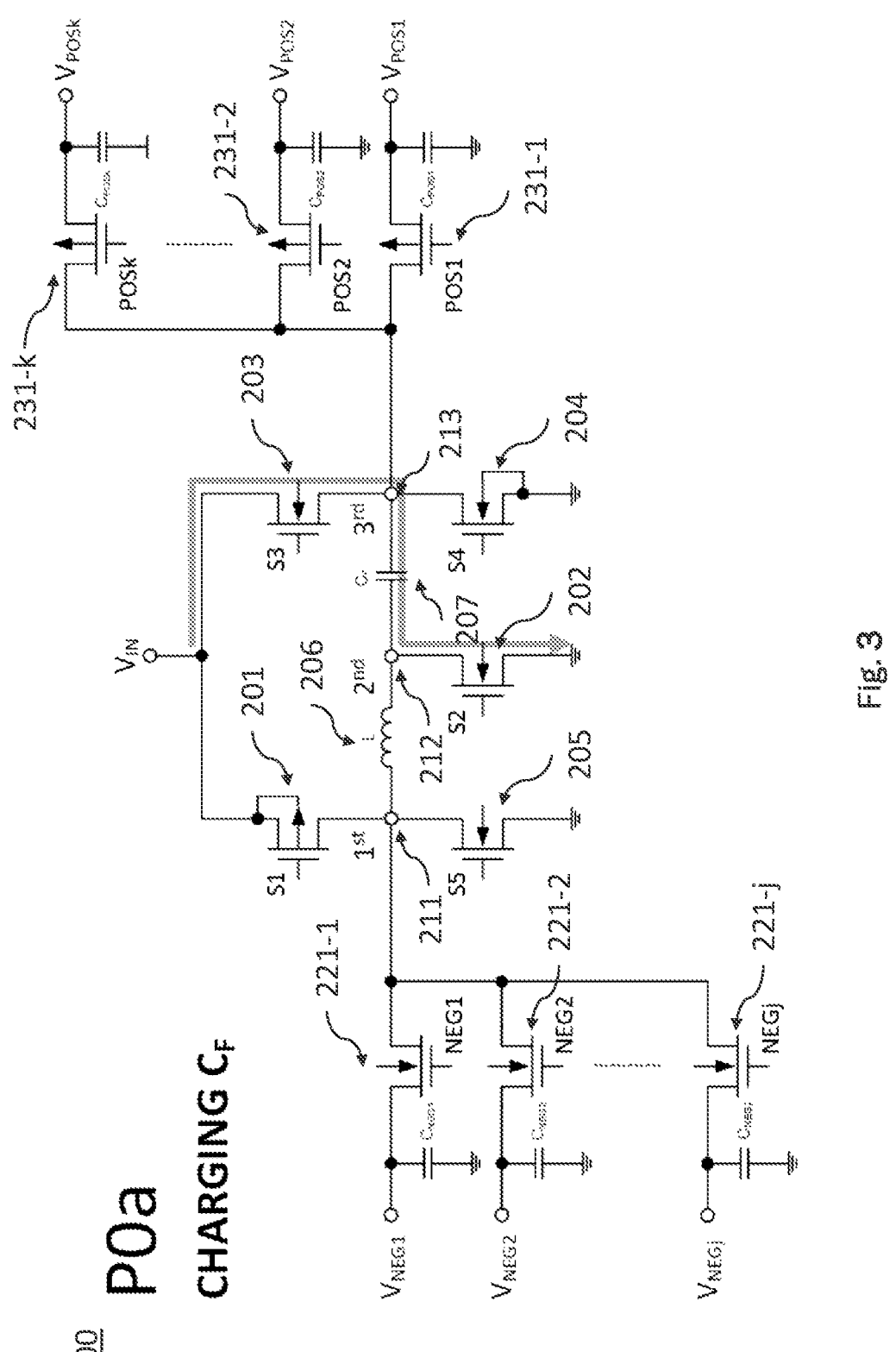

First, FIG. 3 schematically describes another possible hybrid phase 0 operation for charging flying capacitor 207 (indicated as P0a in FIG. 3, in comparison with P0b as shown in FIG. 4). As may be understood and appreciated by the skilled person, generally speaking, between PFM pulses there may always be a charging flying capacitor phase (denoted as P0 in general) applied. However, it may be worth emphasizing that, utilizing P0b as described above with reference to FIG. 4 may significantly eliminate ringing and also enable reusing of the remaining inductor energy to (re-)charge the flying capacitor, particularly when the inductor current goes negative.

Figure 5:
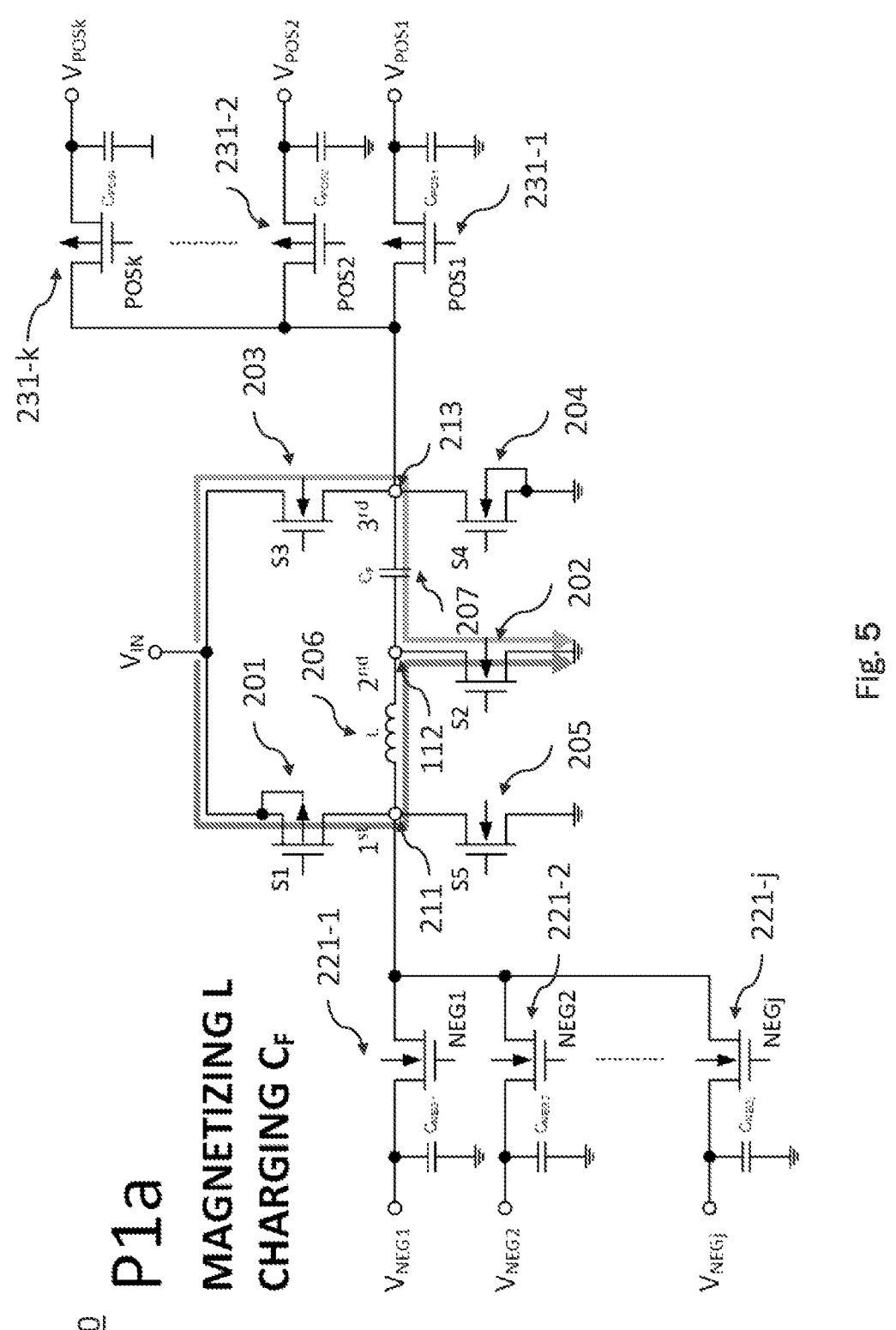

FIG. 5 (together with the earlier illustrated FIGS. 6 and 7) schematically describes a phase 1 operation (denoted as P1 in general) for magnetizing the inductor 206. Generally speaking, typically, the inductor 206 may be magnetized from $V_{IN}$ as exemplarily shown in FIG. 5 (indicated as P1a), or from the flying capacitor 207 as exemplarily shown in FIG. 6 (indicated as P1b).

Notably, by the regulator topology as proposed in the present disclosure, a third possible operation (indicated as P1c in FIG. 7) could be achieved, that is, the inductor 206 may now be enabled to be magnetized from both $V_{IN}$ and the flying capacitor 207 simultaneously. As mentioned earlier, this mode may provide two times faster inductor magnetization (or in other words, 2× magnetizing current slope of P1a or P1b). Generally speaking, this operational phase may be considered to be particularly suitable for cases with high $V_{IN}$ to $V_{OUT}$ differences (e.g., at $V_{IN\_min}$ and $V_{OUT\_max}$).

For the sake of completeness, another two possible operational phases (indicated as P2p and P3n, respectively) will be briefly discussed with reference to FIGS. 8 and 11.

Figure 8:
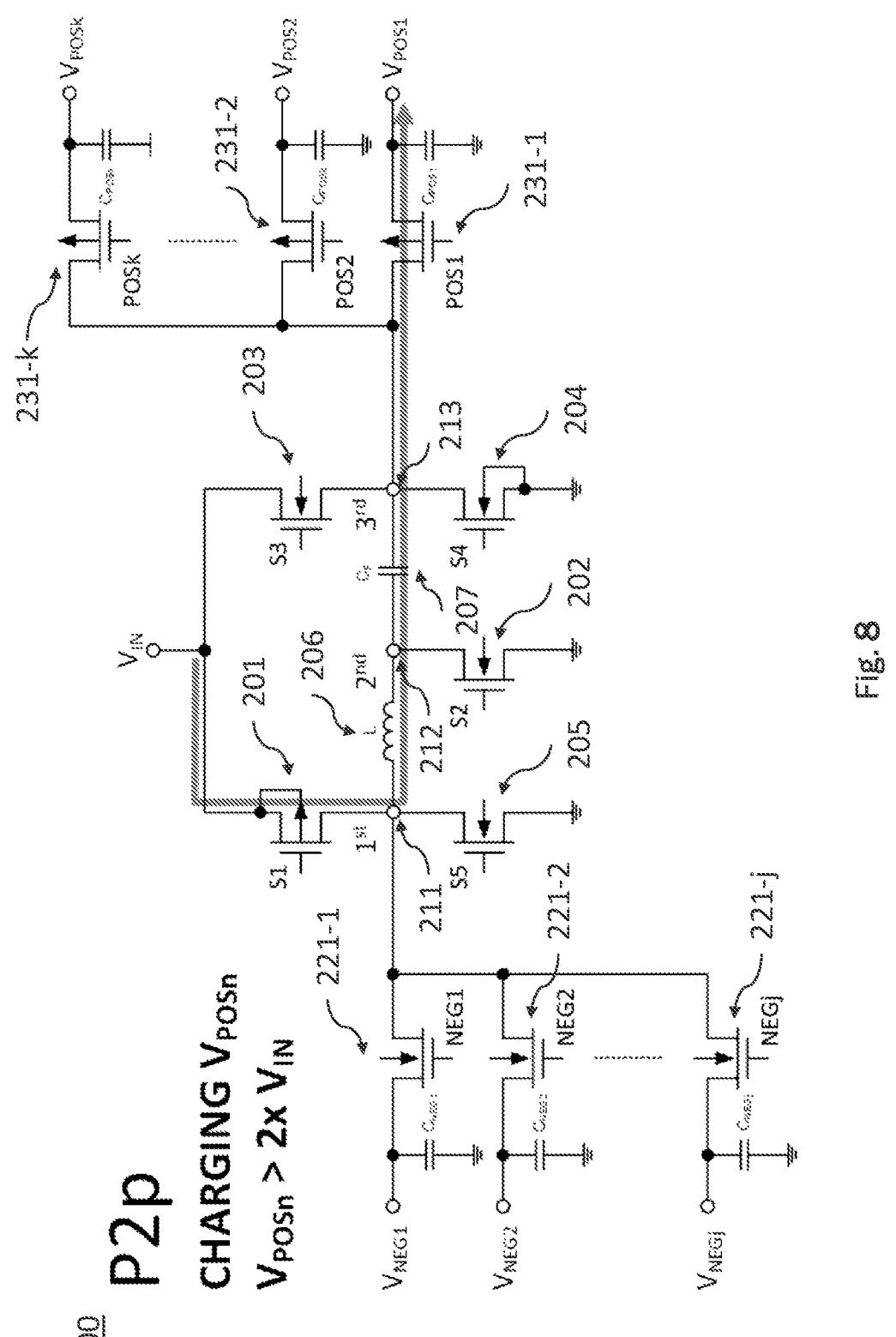

In particular, as shown in FIG. 8, the mode P2p may be considered applicable for charging any one of the positive rails, particularly in cases when $V_{POSn}>2\times V_{IN}$. To achieve this, the first switching element 201 is set to the ON state, while the second, third, fourth and fifth switching elements 202 to 205 are set to the OFF state, thereby coupling the inductor 206 in series to a positive rail (e.g., $V_{POS1}$ via switching element 231-1) through the capacitor 207.

Figure 11:
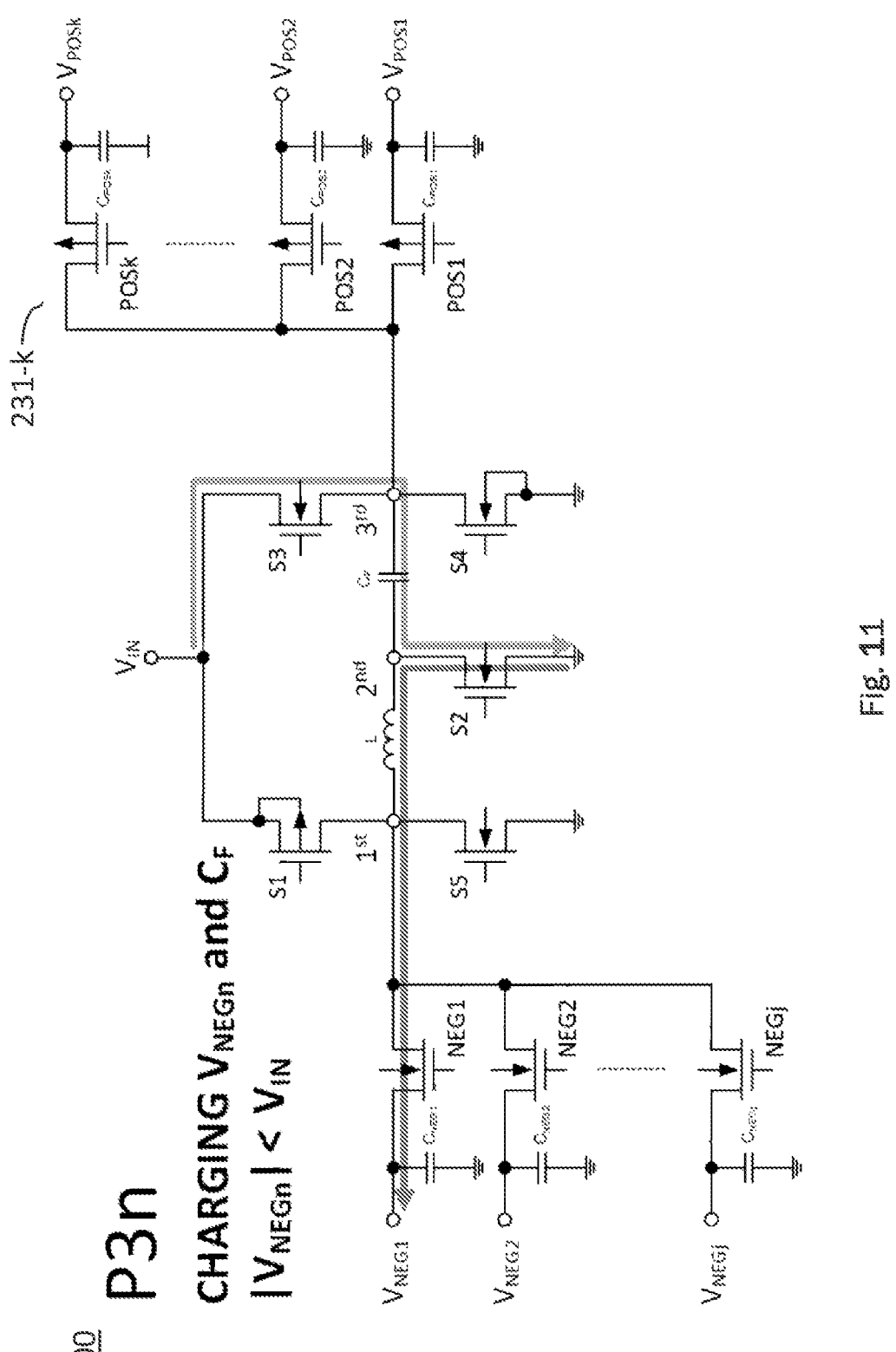

Similarly, as shown in FIG. 11, the mode P3n may be considered applicable for charging any one of the negative rails (and at the same time also the capacitor), particularly in cases when $|V_{NEGn}|<V_{IN}$. To achieve this, the second and third switching elements 202 and 203 are set to the ON state, while the first, fourth and fifth switching elements 201, 204 and 205 are set to the OFF state, thereby coupling the inductor 206 in series to a negative rail (e.g., $V_{NEG1}$ via switching element 221-1) and to the GND. At the same time, the flying capacitor 207 is charged from the source input, as indicated by the arrow.

It may be worthwhile to note that, even though not explicitly shown in the figures, in order to correctly operate the switching devices therein, the voltage regulator topologies may further comprise a suitable control unit for generating the corresponding control signals, as will be understood and appreciated by the skilled person.

As noted above, the techniques proposed throughout the present disclosure provide significant improvements in both the conventional SIMO and the conventional hybrid SIMO topologies. For illustrative purposes only, Table 1 below schematically summarizes several (non-exhaustive) benefits/advantages of the present disclosure in comparison with the conventional SIMO and the conventional hybrid SIMO implementations.

TABLE 1

| | Comparison between the present disclosure with convention (hybrid) SIMO. | | | |
|---|---|---|---|---|
| Item/Feature | Conventional SIMO | Conventional hybrid SIMO | The present disclosure | Benefits of the present disclosure versus conventional (hybrid) SIMO |
| Lower inductor peak current | N/A | Yes (compared to conventional SIMO) | Yes (compared to conventional SIMO) | Lower inductor conductive and core losses |
| One $C_F$ for positive and negative rails | N/A | No | Yes | Enables hybrid operation for both positive and negative rails with the same BOM and number of pins as conventional hybrid SIMO |

TABLE 1-continued

Comparison between the present disclosure with convention (hybrid) SIMO.

| Item/Feature | Conventional SIMO | Conventional hybrid SIMO | The present disclosure | Benefits of the present disclosure versus conventional (hybrid) SIMO |
|---|---|---|---|---|
| Charging $C_F$ via L | N/A | No | Yes | Significant reduction of voltage ringing across L and reusing L's remaining energy to recharge $C_F$ |
| Magnetizing L from $C_F$ only | N/A | No | Yes | Lower input current ripple (lower input EMI) and reduces the number of power transistor switching events, and hence, reduces switching losses |
| Magnetizing L from source $V_{IN}$ and $C_F$ | N/A | No | Yes | 2x faster magnetizing inductor current, which reduces conductive losses because of shorter PFM pulses and provides a faster dynamic response |
| Positive rails can operate down to $V_{IN}$ | Yes | No | Yes | Extended range of positive rails operation down to $V_{IN}$ voltage |

As can be seen from the above summarizing table, generally speaking, some feature(s) supported by convention SIMO is/are not supported by the conventional hybrid SIMO and vice versa. However, the technique proposed in the present disclosure generally supports all those features.

Finally, FIG. 12 is a flowchart schematically illustrating an example of a method 1200 of operating a DC-DC voltage regulator (e.g., a SIMO regulator) according to embodiments of the disclosure. The DC-DC voltage regulator may correspond to the voltage regulator 200 as shown in FIG. 2. The method 1200 comprises, at step S1210, coupling (e.g., directly or indirectly connecting) a first switching element, an inductive element (e.g., an inductor), and a second switching element in series between the input port and a reference voltage port. The reference voltage port may for example be connected to ground (GND) or VSS (or any other suitable reference voltage). The method 1200 further comprises, at step S1220, coupling at least one negative output rail between a first intermediate node and a respective output port. Particularly, the first intermediate node may be arranged between the first switching element and the inductive element. Each of the negative output rails may be configured to generate a respective negative voltage (e.g., −5 V or the like) at a respective (negative) output port. The method 1200 yet further comprises, at step S1230, coupling a capacitive element (e.g., a capacitor) between a second intermediate node and a third intermediate node. Particularly, the second intermediate node may be arranged between the inductive element and the second switching element. The method 1200 also comprises, at step S1240, coupling a third switching element between the input port and the third intermediate node. In addition, the method 1200 comprises, at step S1250, coupling at least one positive output rail between the third intermediate node and a respective output port. Similar to the negative output rail, each of the positive output rails may be configured to generate a respective positive voltage (e.g., +5 V or the like) at a respective (positive) output port. Moreover, the method 1200 also comprises, at step S1260, coupling a fourth switching element between the third intermediate node and the reference voltage port. Finally, the method 1200 comprises, at step S1270, coupling a fifth switching element between the first intermediate node and the reference voltage port. Notably, any switching elements/devices mentioned in this disclosure may be transistor devices, such as FETs, MOSFETs, etc., or any other suitable switching devices, as will be understood and appreciated by the skilled person.

Notably, broadly speaking, the hybrid-SIMO topology as proposed throughout the present disclosure allows for a great deal of flexibility of phase sequences that in turn allow for providing stable negative and/or positive output rails and maintaining stable flying capacitor voltage. For illustrative purposes only, some non-limiting examples of possible phase sequencing supported by the proposed hybrid-SIMO implementation of the present disclosure are listed as follows.

As a first possible phase sequencing example (e.g., the positive rail $V_{POS1}$ may be used as an example),
  if $V_{POS1} > 2 \times V_{IN}$, then the order of phases may be configured as (in a repeated manner):
  . . . P0b→P1c→P2p . . . (returning to P0b);
  on the other hand, if $V_{IN} < V_{POS1} < 2 \times V_{IN}$, then the order of phases may be configured as (in a repeated manner):
  . . . P0b→P2p→P3p . . . (returning to P0b).

As a second possible phase sequencing example (e.g., the negative rails $V_{NEGn}$ may be used as an example):
  if $|V_{NEGn}| > V_{IN}$, then the order of phases may be configured as (in a repeated manner):
  . . . P0b→P1b→P2n . . . (returning to P0b);
  on the other hand, if $0 < |V_{NEGn}| < V_{IN}$, then the order of phases may be configured as (in a repeated manner):
  . . . P0b→P2n→P3n . . . (returning to P0b).

As a third possible phase sequencing example, particularly in situations where the voltage across the inductor might be close to zero (or slightly positive or slightly negative) causing the inductor current to be (near) "flat" during P2p and P2n phases, namely:
  if $|V_{NEGn}| \approx V_{IN}$, then the order of phases may be configured as (in a repeated manner):
  . . . P0b→P1b→P2n→P3n . . . (returning to P0b).

Similarly, this may also hold for the positive rails. That is, as a fourth possible phase sequencing example:
  if $V_{POSn} \approx 2 \times V_{IN}$, then the order of phases may be configured as (in a repeated manner):
  . . . P0b→P1c→P2p→P3p . . . (returning to P0b).

Notably, in the examples shown above, the phase sequencing may appear to always start (and restart) with phase P0b. This may be simply because, as illustrated above, in such phase P0b, the remaining energy in the inductor is reused for charging the flying capacitor. Certainly, as can be understood and appreciated by the skilled person, any other suitable operational order of phases may be adopted, depending on various implementations and/or requirements. Generally speaking, the choice of the phase sequencing may take into consideration at least one of: the number of transistor switch-overs, fast response, reduced EMI, utilizing (reusing) of energy (e.g., in the flying capacitor), or the like.

It should also be noted that the apparatus features described above correspond to respective method features that may however not be explicitly described, for reasons of conciseness. The disclosure of the present document is considered to extend also to such method features. In particular, the present disclosure is understood to relate to methods of operating the circuits described above, and/or to providing and/or arranging respective elements of these circuits.

It should further be noted that the description and drawings merely illustrate the principles of the proposed circuits and methods. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed method. Furthermore, all statements herein providing principles, aspects, and embodiments of the invention, as well as specific examples thereof, are intended to encompass equivalents thereof.

What is claimed is:

1. A DC-DC voltage regulator for converting an input voltage at an input port into one or more output voltages at respective output ports, the DC-DC voltage regulator comprising:

a first switching element, an inductive element, and a second switching element coupled in series between the input port and a reference voltage port;

at least one negative output rail coupled between a first intermediate node and a respective output port, wherein the first intermediate node is arranged between the first switching element and the inductive element;

a capacitive element coupled between a second intermediate node and a third intermediate node, wherein the second intermediate node is arranged between the inductive element and the second switching element;

a third switching element coupled between the input port and the third intermediate node, at least one positive output rail coupled between the third intermediate node and a respective output port;

a fourth switching element coupled between the third intermediate node and the reference voltage port; and a fifth switching element coupled between the first intermediate node and the reference voltage port, wherein during operation of a third phase of the DC-DC voltage regulator, the fourth switching element is in an ON state, and the first, second, third and fifth switching elements are in an OFF state, thereby coupling the inductive element to the at least one negative output rail and in series with the capacitive element to the reference voltage port.

2. The DC-DC voltage regulator according to claim 1, wherein:

the fourth switching element is configured for coupling the capacitive element in series with the inductive element for the at least one negative output rail during operation of the DC-DC voltage regulator; and/or the fifth switching element is configured for coupling the capacitive element in series with the inductive element for the at least one positive output rail during operation of the DC-DC voltage regulator.

3. The DC-DC voltage regulator according to claim 1, wherein the third and fifth switching elements are configured for charging the capacitive element via the inductive element during operation of the DC-DC voltage regulator.

4. The DC-DC voltage regulator according to claim 1, wherein the fourth and fifth switching elements are configured for magnetizing the inductive element by using the capacitive element during operation of the DC-DC voltage regulator.

5. The DC-DC voltage regulator according to claim 1, wherein the first and fourth switching elements are configured for magnetizing the inductive element by using both the input voltage and the capacitive element at the same time during operation of the DC-DC voltage regulator.

6. The DC-DC voltage regulator according to claim 1, comprising a first phase for charging the capacitive element.

7. The DC-DC voltage regulator according to claim 6, wherein, during operation of the first phase, the third and fifth switching elements are in an ON state, and the first, second and fourth switching elements are in an OFF state, such that the capacitive element is charged via the inductive element.

8. The DC-DC voltage regulator according to claim 1, comprising a second phase for magnetizing the inductive element.

9. The DC-DC voltage regulator according to claim 8, wherein, during a first operation of the second phase, the first, second and third switching elements are in an ON state, and the fourth and fifth switching elements are in an OFF state, such that the capacitive element is charged and the inductive element is magnetized from the input voltage.

10. The DC-DC voltage regulator according to claim 8, wherein, during a second operation of the second phase, the fourth and fifth switching elements are in an ON state, and the first, second and third switching elements are in an OFF state, such that the inductive element is magnetized from the capacitive element.

11. The DC-DC voltage regulator according to claim 8, wherein, during a third operation of the second phase, the first and fourth switching elements are in an ON state, and the second, third and fifth switching elements are in an OFF state, such that the inductive element is magnetized from both the input voltage and the capacitive element.

12. The DC-DC voltage regulator according to claim 1, wherein, during operation of a fourth phase of the DC-DC voltage regulator, the fifth switching element is in an ON state, and the first, second, third and fourth switching elements are in an OFF state, thereby coupling the inductive element to the reference voltage port and in series with the capacitive element to the at least one positive output rail.

13. A method for operating a DC-DC voltage regulator for converting an input voltage at an input port into one or more output voltages respectively at respective output ports, the method comprising:

coupling a first switching element, an inductive element, and a second switching element in series between the input port and a reference voltage port, coupling at least one negative output rail between a first intermediate node and a respective output port, wherein the first intermediate node is arranged between the first switching element and the inductive element, coupling a capacitive element between a second intermediate node and a third intermediate node, wherein the second intermediate node is arranged between the inductive element and the second switching element, coupling a third switching element between the input port and the third intermediate node, coupling at least one positive output rail between the third intermediate node and a respective output port, coupling a fourth switching element between the third intermediate node and the reference voltage port, coupling a fifth switching element between the first intermediate node and the reference voltage port, and during operation of a third phase of the DC-DC voltage regulator, switching the fourth switching element to an ON state, and switching the first switching element, the second switching element, the third switching element and the fifth switching element to an OFF state, for coupling the inductive element to the at least one negative output rail and in series with the capacitive element to the reference voltage port.

14. The method according to claim 13, further comprising, during operation of a first phase of the DC-DC voltage regulator for charging the capacitive element:

switching the third and fifth switching elements to an ON state, and switching the first, second and fourth switching elements to an OFF state, for charging the capacitive element via the inductive element.

15. The method according to claim 13, further comprising, during a first operation of a second phase of the DC-DC voltage regulator for magnetizing the inductive element:

switching the first, second and third switching elements to an ON state, and switching the fourth and fifth switching elements to an OFF state, for charging the capacitive element and magnetizing the inductive element from the input voltage.

16. The method according to claim 13, further comprising, during a second operation of a second phase of the DC-DC voltage regulator for magnetizing the inductive element:

switching the fourth and fifth switching elements to an ON state, and switching the first, second and third switching elements to an OFF state, for magnetizing the inductive element from the capacitive element.

17. The method according to claim 13, further comprising, during a third operation of a second phase of the DC-DC voltage regulator for magnetizing the inductive element:

switching the first and fourth switching elements to an ON state, and switching the second switching element, the third switching element and the fifth switching element to an OFF state, for magnetizing the inductive element from both the input voltage and the capacitive element.

18. The method according to claim 13, further comprising, during operation of a fourth phase of the DC-DC voltage regulator:

switching the fifth switching element to an ON state, and switching the first, second, third and fourth switching elements to an OFF state, for coupling the inductive element to the reference voltage port and in series with the capacitive element to the at least one positive output rail.

19. The method according to claim 13, further comprising, for generating a positive output voltage larger than two times the input voltage:

repeatedly operating the DC-DC voltage regulator according to a predetermined operation sequence that involves:

switching the third and fifth switching elements to an ON state, and switching the first, second and fourth switching elements to an OFF state;

switching the first and fourth switching elements to the ON state, and switching the second switching element, the third switching element and the fifth switching element to the OFF state; and switching the first switching element to the ON state, and switching the second switching element, the third switching element, the fourth switching element and the fifth switching element to the OFF state.

20. The method according to claim 13, further comprising, for generating a positive output voltage larger than the input voltage but less than two times the input voltage:

repeatedly operating the DC-DC voltage regulator according to a predetermined operation sequence that involves:

switching the third and fifth switching elements to an ON state, and switching the first, second and fourth switching elements to an OFF state;

switching the first switching element to the ON state, and switching the second switching element, the third switching element, the fourth switching element and the fifth switching element to the OFF state; and switching the fifth switching element to the ON state, and switching the first, second, third and fourth switching elements to the OFF state.

21. The method according to claim 13, further comprising, for generating a negative output voltage having an absolute magnitude larger than the input voltage:

repeatedly operating the DC-DC voltage regulator according to a predetermined operation sequence that involves:

switching the third and fifth switching elements to an ON state, and switching the first, second and fourth switching elements to an OFF state;

switching the fourth and fifth switching elements to the ON state, and switching the first, second and third switching elements to the OFF state; and switching the fourth switching element to the ON state, and switching the first switching element, the second switching element, the third switching element and the fifth switching element to the OFF state.

22. The method according to claim 13, further comprising, for generating a negative output voltage having an absolute magnitude larger than 0 but less than the input voltage:

repeatedly operating the DC-DC voltage regulator according to a predetermined operation sequence that involves:

switching the third and fifth switching elements to an ON state, and switching the first, second and fourth switching elements to an OFF state;

switching the fourth switching element to the ON state, and switching the first switching element, the second switching element, the third switching element and the fifth switching element to the OFF state; and switching the second and third switching elements to the ON state, and switching the first switching element, the fourth switching element and the fifth switching element to the OFF state.

* * * * *